(12) United States Patent
Van Der Beek et al.

(10) Patent No.: US 6,645,545 B1
(45) Date of Patent: Nov. 11, 2003

(54) HEAT TREATED CEREALS AND PROCESS OF MAKING

(75) Inventors: Marius Van Der Beek, Vlaardingen (NL); Aris Graveland, Bennekom (NL); Gopinath Babasaheb Rajale, Mumbai (IN)

(73) Assignee: Lipton, division of Conopco, Inc., Englewoods Cliffs, NJ (US)

( * ) Notice: Subject to any disclaimer, the term of this patent is extended or adjusted under 35 U.S.C. 154(b) by 0 days.

(21) Appl. No.: 09/709,059

(22) Filed: Nov. 9, 2000

(30) Foreign Application Priority Data

Nov. 12, 1999 (EP) .............................................. 99203777

(51) Int. Cl.$^7$ ................................................. A23D 6/00
(52) U.S. Cl. ........................ 426/622; 426/467; 426/549
(58) Field of Search ................................. 426/467, 549, 426/622

(56) References Cited

U.S. PATENT DOCUMENTS

| | | | |
|---|---|---|---|
| 3,162,535 A | | 12/1964 | Ferrel |
| 3,595,541 A | * | 7/1971 | Pabich ........................ 263/21 |
| 3,886,855 A | | 6/1975 | Nara |
| 4,478,862 A | | 10/1984 | Greethead |
| 4,479,920 A | | 10/1984 | Dodson |
| 4,650,681 A | * | 3/1987 | Greethead ................... 326/622 |
| 6,098,905 A | * | 8/2000 | Salem et al. .................... 241/3 |

FOREIGN PATENT DOCUMENTS

| | | |
|---|---|---|
| EP | 0 068 853 | 3/1987 |
| EP | 0 288 141 | 10/1988 |
| EP | 0 382 768 | 9/1994 |
| GB | 814756 | 6/1959 |
| GB | 1 474 422 | 5/1977 |
| WO | 94/14340 | 7/1994 |
| WO | 97/41737 | 11/1997 |
| WO | 01/12287 | 2/2001 |

OTHER PUBLICATIONS

European Search Report mailed Feb. 28, 2001.
Sander ten Have, U.S. Application No. 10/049,657 is the U.S. national phase of PCT WO 01/12287 already of record.

* cited by examiner

*Primary Examiner*—Helen Pratt
(74) *Attorney, Agent, or Firm*—Gerard J. McGowan, Jr.

(57) ABSTRACT

Heat treated cereal grains can be obtained from cereal grains by a process, wherein the cereal grains are subjected to a heat treatment with a gas in an annular fluidized bed, which gas has different velocity components; the grains obtained result after milling in a flour with:

25–80% damaged starch a water binding capacity of 1.5–6 g/g an initial gelatinization temperature of more than 50° C.

particle size of 1–200 μm.

19 Claims, No Drawings

HEAT TREATED CEREALS AND PROCESS OF MAKING

Chapati is a well known product in the Asian culture which nowadays becomes more and more popular outside Asia as well. A chapati needs to meet a number of quality requirements in order to be considered as acceptable for the consumer. E.g. the chapati needs to be soft and the shortness (shear value) of a chapati (as a criterium for toughness and chewiness) needs to be correct to provide the desired product characteristics to the chapati. Moreover the known production processes for making a chapati often lack of ease of kneading of the dough, whereas the way the dough resulting from these known processes can be sheeted is also often very difficult. Moreover the puffing of the doughs resulting from these known processes also is often insufficient. Baked chapati also suffers from very short shelflife. It would further be very beneficial if softness and pliability of chapatis could be increased over a period of 4 hours after baking.

Therefore we performed a study to find out whether we could develop a modified wheat flour that upon use in chapati could solve all of above problems. This study resulted in the finding of a novel wheat flour with very good product characteristics so that this flour is very suitable for use in chapati's. These novel wheat flours can be made by a very specific process which is also part of our invention. Simultaneously we found that this new process also could be applied on rye grains resulting in products with beneficial product characteristics for applications in other food areas.

Therefore our invention concerns in the first instance heat treated wheat or rye grains that are characterised by:

- a bulk density of 0.4 to 0.75 kg/l, preferably 0.45 to 0.65 kg/l, most preferably 0.5 to 0.6 kg/l and
- a dry gluten content of 0 to 2 wt %, preferably 0 to 1 wt %, most preferably 0 to 0.5 wt %.

The bulk density is measured by determining the volume of 100 g of material in a measuring cylinder and is expressed as kg/l and the gluten content is measured by AACC method 38–10 ($9^{th}$ Ed, 1995).

When the products mentioned above are milled using well known milling methods a flour is obtained that can be used for the purposes set out above. This flour can be charaterised by:

- an amount of damaged starch, as measured by AACC method 76.30A of 25 to 80 wt %, preferably 35 to 65 wt %, most preferably 40 to 60 wt % of the total amount of starch in the flour
- a water binding capacity of more than 1.5 and less than 6 g water per g dry matter, preferably from 2 to 5, most preferably from 2.5 to 4 g water per g dry matter
- and having an initial gelatinisation temperature by amylograph of more than 50° C., preferably more than 60° C.

and having a particle size of 1 to 200 micron.

The amount of damaged starch is defined on basis of AACC method 76.30A. If another method would be applied another outcome should be expected thus it is important to use this standard method.

The water binding capacity is measured by mixing 1 g of flour with 6 g of demineralised water in a 10 ml centrifuge tube. It is rested for 30 minutes and then centrifugated for 10 minutes at 10.000 rpm, the supernatant is discanted, the weight increase is measured and expressed as Water Binding Capacity. The gelatinisation temperature is measured by a Brabender amylograph metod (ICC method 126.) The bulk density of above flours is less than 0.57, preferably less than 0.55, most preferably less than 0.52 kg/l. The dry gluten content of these flours is less than 2 wt %, preferably less than 1 wt %, most preferable 0 to 0.5 wt %.

Chapati dough cannot be made with pure treated flour. Minimal 50% standard flour should be present. We found that the desired improvements already could be obtained to a large extent if a blend of the flour according to the invention with another flour was applied. Therefore our invention also concerns blends comprising 50 to 95 wt % of a standard flour and 50 to 5 wt % of a flour according to the invention wherein the blend has a initial gelatinisation temperature of more than 40° C., preferably more than 50° C., most preferably more than 55° C.

The heat treated grains according to the invention can be made by a process wherein a cereal, selected from the group consisting of wheat and rye is introduced in a reactor, wherein an annular fluidized bed from the grain is maintained above a perforated plate by introducing the grains above the perforated plate and simultaneously introducing fluidizing gas, providing a tangential velocity component to the fluidizing bed and fluidizing gas, providing an axial velocity component to the fluidizing bed from below the perforated plate in the reactor at a temperature of 200 to 350° C., in which fluidized bed the grain is subjected to a heat treatment for 15 to 90 sec, while avoiding local overheating and overburning. Equipment that can be used for performing this process is disclosed in a number of patents such as EP 68853; EP 288141; EP 382769. However the best equipment which gives the best results is the equipment disclosed in our copending EP application 99202665.8 (filing date Aug. 17, 1999).

In above process it is advantageous to introduce the gas providing the tangential velocity component to the fluidizing bed as a pulsating gas. Very beneficial results are obtained if the pulsation of the tangentially introduced gas occurs with a frequency of 0.25 to 10 Herz.

According to another embodiment of our invention we found that the flours according to the invention can be used for the improvement of a number of parameters of the chapati product or for a number of process characteristics. Therefore our invention also concerns the use of a wheat flour according to the invention or of a blend, containing the wheat flour according to the invention to increase the ease of kneading and/or the ease of sheeting and/or puffing of a chapati dough, and/or to improve the softness, and/or the shortness (less tough and chewy) of a chapati.

A last embodiment of our invention concerns chapati flours that are a mix of a standard flour and a heat treated flour according to the invention, in particular a flour comprising 1 to 25 wt % of a special flour, in addition to a standard flour, wherein the special flour is a heat treated wheat flour according to the invention or a blend containing this flour according to the invention.

It was further found that rye flours made by our novel process and which meet the same product characteristics as our novel wheat flours could be used beneficially for the production of Dutch Honey cake. It was further found that wheat flours made by our novel process could be used beneficially for the production of dried soup or for the production of cakes (wherein it can be applied as non-chlorinated flour) or for the production of snacks such as croquettes or bitterballen.

EXAMPLE

An amount of 250 g of whole wheatgrains (Lok 1 Indore from India) was treated in a pilot plant equipment according to the description in EP99202665.8 for a period of 30 seconds at 300° C.

The grains are characterised by the following parameters.

| Parameter | Wheat grains A | Wheat grains B |
|---|---|---|
| Bulk density (kg/l) | 0.84 | 0.51 |
| Dry gluten (%) | 11.7 | Nil |

Wheat flour for chapati preparation was milled from the untreated wheat grains (sample A) and from the treated grains (sample B) using a typical stone mill. The obtained wheat flours A and B are characterised by the following parameters.

| Parameter | Flour A | Flour B |
|---|---|---|
| Bulk density (kg/l) | 0.57 | 0.42 |
| Dry gluten (%) | 11.7 | Nil |
| Damaged starch (%) | 17.9 | 50.5 |
| Water Binding Capacity | 1.4 | 2.9 |
| Initial gelatinisation point (° C.) | 63 | 65 |
| Particle size (% less than 80 micron) | 88.9 | 80.0 |

From sample A as well as of mixtures of A and B chapatis were prepared. This resulted in the folloing characteristics.

| Characteristic | Sample A | Sample A 90%/B 10% | Sample A 80%/B 20% |
|---|---|---|---|
| Dough colour | Light creamy | Light creamy | Light creamy |
| Water absorption (ml) | 68.6 | 76.6 | 80.6 |
| Kneading | | Easier | Easier |
| Sheeting | | Easier | Easier |
| Height on puffing (cm) | 5.8 | 5.9 | 5.8 |
| Shear value initial | 6.7 | 7.2 | 7.6 |
| Shear value after 4 hrs | 6.4 | 7.0 | 7.4 |
| Pliability initial | 4.3 | 4.6 | 4.8 |
| Pliability after 4 hrs | 4.2 | 4.5 | 4.7 |
| Handfeel | Soft | Very soft | Very, very soft |
| Eating quality | Satisfactory | Satisfactory | Satisfactory |

What is claimed is:

1. Flour from heat treated wheat or rye grains, characterized by:
   an amount of damaged starch, as measured by AACC method 76.30A, of from 25 to 80 wt %, of the total amount of starch in the flour
   a water binding capacity of more than 1.5 and less than 6 g water per g dry matter,
   and having an initial gelatinisation temperature by amylograph of more than 50° C.,
   and having a particle size of from 1 to 200 micron.

2. The flour according to claim 1, wherein the flour has a bulk density of less than 0.57 kg/l.

3. The flour according to claim 2, wherein the flour has a bulk density of less than 0.55 kg/l.

4. The flour according to claim 3, wherein the flour has a bulk density of less than 0.52 kg/l.

5. The flour according to claim 1, wherein the flour has a dry gluten content of less than 2 wt %.

6. The flour according to claim 5, wherein the flour has a dry gluten content of less than 1 wt %.

7. The flour according to claim 6, wherein the flour has a dry gluten content of 0 to 0.5% wt.

8. Blends comprising from 50 to 95 wt % of a standard flour and from 95 to 50 wt % of a flour according to claim 1 wherein the blend has a initial gelatinisation temperature of more than 40° C.

9. The blend of claim 8 wherein the blend has a initial gelatinisation temperature of more than 50° C.

10. The blend of claim 9 wherein the blend has a initial gelatinisation temperature of more than 55° C.

11. A process for the production of the flour from the heat treated wheat or rye grains of claim 1, wherein a cereal, selected from the group consisting of wheat and rye, is introduced in a reactor, wherein an annular fluidized bed from the cereal grain is maintained above a perforated plate by introducing the cereal grains above the perforated plate and simultaneously introducing fluidizing gas, providing a tangential velocity component to the fluidizing bed and fluidizing gas, providing an axial velocity component to the fluidizing bed from below the perforated plate in the reactor at a temperature of from 200 to 350° C., in which fluidized bed the cereal grain is subjected to a heat treatment for from 15 to 90 sec, while avoiding local overheating and overburning to produce heat treated wheat or rye grains and wherein the heat treated wheat or rye grains are subsequently milled to produce the flour.

12. The process of claim 11, wherein the gas providing the tangential velocity component to the fluidizing bed is introduced as a pulsating gas.

13. The process of claim 12, wherein the pulsation of the tangentially introduced gas occurs with a frequency of 0.25 to 10 Herz.

14. A chapati flour comprising of from 1 to 25 wt % of a special flour, in addition to a standard flour, wherein the special flour is the heat treated wheat flour of claim 1.

15. The flour of claim 1 wherein the amount of damaged starch, as measured by AACC method 76.30A is from 35 to 65 wt %.

16. The flour of claim 15 wherein the amount of damaged starch, as measured by AACC method 76.30A, is from 40 to 60 wt % of the total amount of starch in the flour.

17. The flour of claim 1 wherein the water binding capacity is more than 2 and less than 5 g water per g dry matter.

18. The flour of claim 17 wherein the water binding capacity is more than 2.5 and less than 4 g water per g dry matter.

19. The flour of claim 1 having an initial gelatinisation temperature by amylograph of more than 60° C.

* * * * *